United States Patent [19]

Tally et al.

[11] 4,182,019

[45] Jan. 8, 1980

[54] METHOD FOR MAKING CORRUGATED HOSE

[75] Inventors: David N. Tally; Richard L. Marsh, both of Lincoln, Nebr.

[73] Assignee: The Goodyear Tire & Rubber Company, Akron, Ohio

[21] Appl. No.: 881,342

[22] Filed: Feb. 27, 1978

Related U.S. Application Data

[63] Continuation of Ser. No. 504,228, Sep. 9, 1974, abandoned, which is a continuation of Ser. No. 353,151, Apr. 20, 1973, abandoned, which is a continuation of Ser. No. 166,138, Jul. 26, 1971, abandoned.

[51] Int. Cl.$^2$ .............. B23P 11/02; B29C 17/07; B29D 23/18
[52] U.S. Cl. .......................... 29/453; 29/456; 264/506
[58] Field of Search .............. 264/94, 98, 179, 322, 264/DIG. 52, 506, 507, 508; 29/421 R, 446, 452, 453, 454, 456

[56] References Cited

U.S. PATENT DOCUMENTS

| Re. 27,675 | 6/1973 | Pacciarini et al. | 264/326 X |
|---|---|---|---|
| 2,788,804 | 4/1957 | Larkin | 152/358 |
| 2,837,121 | 6/1958 | Roberts | 264/94 |
| 2,897,840 | 8/1959 | Roberts et al. | 264/94 |
| 2,967,563 | 1/1961 | Huff et al. | 264/295 |
| 3,495,494 | 2/1970 | Scott | 264/257 |

Primary Examiner—Jan H. Silbaugh
Attorney, Agent, or Firm—R. P. Yaist

[57] ABSTRACT

The method of manufacturing an improved collapse-resistant corrugated hose of flexible elastomeric material including a tubular structure which preferably includes a single layer of textile reinforcement which may be of a knit construction. The tubular structure is formed to an outside diameter essentially that of the maximum diameter of the mold cavity then placed therein and vulcanized under heat and pressure to mold form cylindrical end portions and a corrugated central portion. A preformed wire insert is then placed in the troughs of the internal corrugations to provide resistance against collapsing when the hose is subjected to a vacuum or bending. The hose is particularly useful in automotive vehicle cooling systems.

11 Claims, 5 Drawing Figures

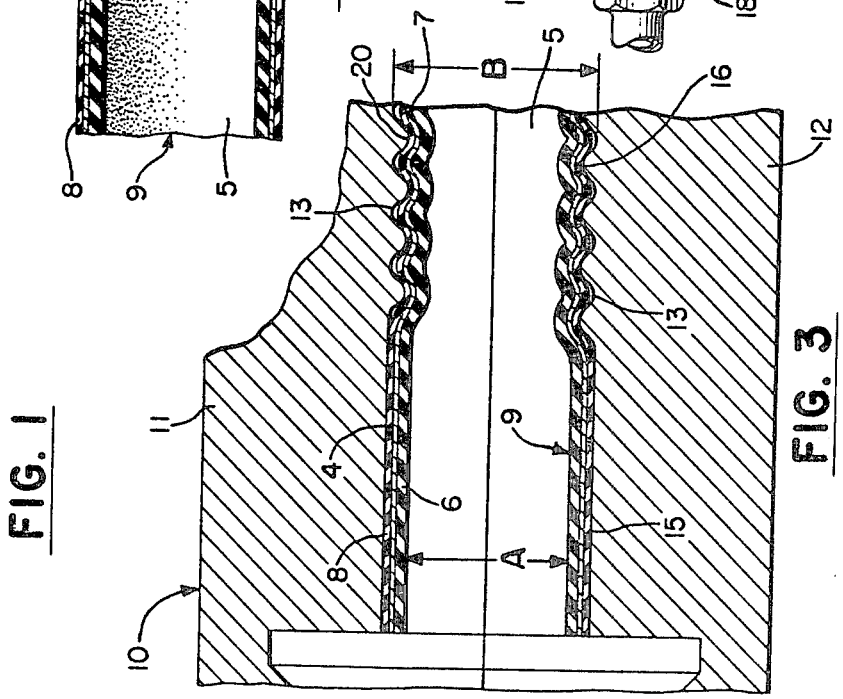

METHOD FOR MAKING CORRUGATED HOSE

This application is a continuation of Ser. No. 504,228; Sept. 9, 1974, abandoned; which is a continuation of Ser. No. 353,151; Apr. 20, 1973, abandoned; which is a continuation of Ser. No. 166,138; July 26, 1971, abandoned.

This invention relates to a new and novel concept in the manufacture of a corrugated flexible collapse-resistant and substantially non-expandable hose. More particularly, such hose is particularly applicable to automobile cooling systems both as replacement as well as original equipment hose.

Hose of this general type has been available for many years, primarily in the after markets, first as a hose of a "wrap-down" construction which later was replaced almost entirely by a "molded" construction. Once the molded hose was introduced, the wrap-down method was for all practical purposes, completely abandoned, at least in the manufacture of hose for automotive use. In either instance, a length of hose consisted of cylindrical end portions for attachment to the radiator and engine and an intermediate corrugated portion to provide the flexibility necessary to bend the hose to fit between the points of attachment. This type of hose in most instances included a resilient preformed wire reinforcement incorporated as an integral part of the wall of the hose structure and usually was incorporated in the corrugated portion only. This wire reinforcement permitted the hose to bend to various configurations without collapse as well as providing resistance to expansion and collapse of the hose during use.

There has been considerable activity in the past in the manufacture of the molded type of hose and as a result, there are numerous patents disclosing various methods and different structures for this particular type of hose. The following are typical of those showing molded hose and/or methods of manufacture:

| United States Patents | |
|---|---|
| No. 2,897,840 | Roberts |
| No. 2,936,812 | Roberts |
| No. 3,050,087 | Caplan |
| No. 3,194,705 | Caplan |
| No. 3,115,898 | Rothemel |
| No. 3,274,316 | Songer |

In each of the foregoing patents as well as others relating to this particular type of hose, the unvulcanized hose structure is either of a diameter substantially smaller than that of the mold cavity or is built or preformed to substantially the mold configuration. As a result, when it is subjected to internal pressure during vulcanization, the unvulcanized hose structure is expanded into contact with the mold surface or the structure is merely pressed against the mold surface to produce the finished hose.

It is therefore an object of this invention to provide a new and novel method of making a flexible corrugated hose.

Another object of the invention is to provide a more economical method of manufacturing a molded, corrugated hose.

An important object of the invention is to provide a method of making a flexible corrugated hose in which the internal corrugations are formed sufficiently deep to retain the preformed wire inserted therein after vulcanization of the hose.

These and other objects of the invention will become more fully apparent as the description proceeds in the following specification and the accompanying drawings.

In the drawings:

FIG. 1 shows an exterior view of the completed hose;

FIG. 2 is a partial section of a typical tubular structure from which the hose is formed;

FIG. 3 is a cross-sectional view of the hose shown in FIG. 2 in place in the mold before vulcanization;

FIG. 4 is a view similar to FIG. 3 with internal pressure applied during vulcanization; and FIG. 5 is a partial cross-section of the finished hose with the wire reinforcement inserted in the interior.

As seen in FIG. 1, a flexible corrugated hose 1 includes an intermediate portion 2 which is corrugated, preferably in a helical path, and straight cylindrical end portions 3 and 4. As shown, the outer diameter of the corrugated portion 2 is substantially the same as the diameters of end portions 3 and 4 although if desired, each of the end portions may be of a different diameter as well as of a diameter different than the corrugations. The length of the hose 1 may be of different lengths depending upon the particular use or application with which the hose is to be used. In the various lengths of hoses 1 that are usually made, the end portions 3 and 4 in many instances are substantially the same with the corrugated portion varying in length according to the overall hose length.

In the preferred method of manufacture of the hose of this invention, a tubular member 5 is formed by extruding an inner tubular element 6 of a predetermined diameter of an elastomeric material such as rubber, synthetic or natural. The material should have the properties necessary to provide resistance to the effects of temperature, fluid compositions, pressure, etc. Over the tubular element 6 a layer 7 of textile material such as nylon, rayon or polyester is knit to provide longitudinal and radial reinforcement to the hose. U.S. Pat. No. 2,788,804 issued to Larkin is illustrative of a typical knit pattern used for hoses of this type. Other types of fabric reinforcement may be used if desired.

The assembly of the inner tubular element 6 and knit 7 is then passed through an extruder to form a cover 8 of elastomeric material over the assembly to form a green hose body 9 with a predetermined outside diameter that is selected to fit properly in the mold cavity to be used to vulcanize the green hose body 9. The selection of the diameter will be subsequently discussed. The methods and apparatus for forming the hose body 9 are well known in the art and have been used for many years by the industry for the forming of the basic tubular reinforced members that are used in this invention.

The mold 10 is of conventional construction made up of an upper half 11 and a lower half 12 which define cavity 13 with straight end portions 14 and 15 and as shown, an intermediate helically corrugated portion 16. End plugs 17 and 18 register adjacent the straight end portions 14 and 15 respectively of mold 10 and as shown, extend inwardly to the corrugated portion 16 but are of a smaller diameter than the adjacent end portions of the mold. End plug 17 has an opening 19 extending therethrough so that steam, air or other fluids under pressure can be admitted to the interior of mold cavity for forming and vulcanizing the hose. The diameter A of the end plugs 17 and 18 is the same as the desired inside diameter of the end portions 3 and 4 of the finished hose 1 and as a result, the end portions 3 and 4 are fully molded on the inside and outside. The fully molded end surfaces provide a smooth surface for installing and clamping the hose.

The green hose body 9 is formed with an outside diameter that is substantially identical to the maximum internal diameter B of the corrugated section 16 of the mold 10, with the diameter being selected so as to prevent pinching of the body when the mold is closed around it. The prior art structures are all of a diameter that is substantially less than that of the mold so substantial expansion takes place when the tubular member is subjected to internal pressure during forming and vulcanization. A section of the tubular member 5 having a length substantially identical to the length of the mold cavity forms the green hose body 9 and is placed in position in the lower mold section 12. The upper mold section 11 is placed in position over the lower section 12 on the heated platens of a conventional vulcanizing platen press (not shown), and the press is then closed on the mold 10 which will close the mold sections 11 and 12 completely around the hose body 9 and end plugs 17 and 18. The end plugs 17 and 18 are then forced or inserted into the ends of the hose body 9 to fully form the ends of the hose body and seal to prevent the loss of pressure during vulcanization. As a result, as best seen in FIG. 3, the inwardly extending portions 20 of the mold corrugations push or move the corresponding portions of tubular member 5 inwardly when mold sections 11 and 12 are closed. Fluid pressure such as air or steam is then introduced into the interior of hose body 9 through opening 19 in end plug 18 to prevent collapse of the hose body 9 and to hold the hose body in contact with the surface of the mold cavity. As a result, portions of the exterior wall of the hose body 9 are depressed by portions 20 to cause the hose body to assume the configuration of the mold cavity in the corrugated portion 16. As a result, the interior wall is corrugated to substantially the same extent. The end portions 3 and 4 are formed both externally and internally against the end plugs 17 and 18 and mold portions 14 and 15 respectively. The heated mold sections in contact with the hose body soften the elastomeric material so that the internal pressure holds the hose against the mold surface. The heat of the internal fluid assists in vulcanizing the elastomeric material.

Since the hose body 9 is not subjected to expansion to any significant degree, the knit reinforcement layer 7 is free to move with the inner tube 6 and cover 8 of the hose body 9 during forming and therefore assumes the corrugated configuration also. It might be said that the knit layer 7 is "free floating" which causes the internal corrugations to be formed to a greater depth to more securely hold the subsequently inserted wire reinforcement in place. In forming similar hoses as shown in the prior art where the tubular element is expanded, the reinforcement layer or knit tends to remain straight due to the lack of extensibility in such structures or at least is stretched to its limit which places the layer under tension. In the hose of this invention, the reinforcement is almost completely relaxed.

By way of example, in the manufacture of the nominal 1½" of this type, the mold has a maximum diameter of 1.817" in the area of the corrugations. The tubular element prepared for use in the manufacture of this size should have an outside diameter between a minimum of about 1.705" and a maximum of about 1.832". It has been found that a tubular element of the following dimensions will provide a very satisfactory hose when formed and vulcanized in the mold having the above-described dimensions.

Inner Tube ID: 1.4219±0.03125
Tube Wall Gauge: 0.160±0.010

Once the hose body is formed and vulcanized, the mold 10 is opened and the formed hose 1 is removed. In the preferred embodiment, a preformed rustproof resilient wire reinforcement 21 is inserted into the interior of the hose to lie in troughs of the corrugated portion 2 of the hose. A turn of the wire lies in each corrugation as seen in FIG. 5. The wire reinforcement 20 may be readily inserted by either twisting to reduce it in diameter, inserting into the interior and then releasing it whereby it expands to fit into the crest or it may be threaded into the hose interior. The wire reinforcement is fit snugly into the crests of the corrugations to prevent any of the turns from being displaced when the hose is flexed or bent during installation or use.

While the previously described method of manufacturing a flexible corrugated hose has been directed to corrugations or a helical configuration, the method may be used to manufacture a hose in which a series of individual corrugations may be used. In such a hose, an individual resilient ring of rustproof wire is inserted into the hose interior so as to lie in the crest of each corrugation.

While certain representative embodiments and details have been shown for the purpose of illustrating the invention, it will be apparent to those skilled in this art that various changes and modifications may be made therein without departing from the spirit or scope of the invention.

We claim:

1. In a method of making a flexible reinforced corrugated hose which includes forming a tubular member of elastomeric material with a reinforcing layer lacking extensibility embedded therein and then subjecting the tubular member to heat and fluid pressure in a closed, corrugated mold cavity to conform the external surface of the tubular member to the mold configuration and at least partially vulcanize the elastomeric material, the improvement which comprises forming said tubular member of an inner elastomeric layer, a knit reinforcing layer lacking extensibility and surrounding said inner elastomeric layer, and an outer elastomeric layer surrounding said knit reinforcing layer with said knit reinforcing layer having openings therein whereby said inner and outer elastomeric layers are interbonded by the passage of the elastomeric material of said layers through the openings in the knit reinforcing layer during vulcanization or partial vulcanization of the elastomeric material and maintaining said knit reinforcing layer in a relaxed, essentially unstretched condition during vulcanization or partial vulcanization of the elastomeric material and preventing any substantial expansion of the tubular member by forming said tubular member with an outside diameter from about 94% to slightly over 100% of the maximum diameter of the mode corrugations whereby during such vulcanization or partial vulcanization the mold engages the external surface of the tubular member to depress the same inwardly in localized areas with the knit reinforcing layer being free floating and assuming the corrugated configuration of the mold to permit the formation of deep internal corrugations in the tubular member of substantially the same depth as that of the mold corrugations whereby a subsequently inserted spiral wire reinforcement of a diameter to fit snugly in the troughs of the internal corrugations is retained in position in the internal corrugations.

2. A method as described in claim 1 in which the external diameter of said tubular member is no more than 0.015 of an inch greater than the maximum diameter of the corrugated mold cavity.

3. A method as described in claim 1 in which the external diameter of said tubular member is no more than 0.112 of an inch less than the maximum internal diameter of the mold corrugations.

4. A method of making a flexible reinforced corrugated hose having a corrugated inner surface with a preformed wire reinforcement inserted therein to fit within the internal corrugations, said method comprising:

(A) providing a mold having at least a portion of the walls thereof being corrugated;

(B) forming an unvulcanized hose body comprised of a tubular member including a layer of textile reinforcing material lacking extensibility and having interstices therein which is embedded in elastomeric material whereby said elastomeric material during any subsequent vulcanization or partial vulcanization of said tubular member will flow through the interstices of the textile reinforcing material to form a rubber to rubber bond;

(C) maintaining said layer of reinforcing material in a relaxed essentially radially unstretched condition and preventing any substantial expansion of the hose body by forming said hose body with a predetermined outside diameter which is from about 94% to slightly over 100% of the maximum diameter of the corrugated portion of said mold with the layer of textile reinforcing material being free floating and assuming the corrugated configuration of the mold whereby said mold in the closed position engages the external surface of said tubular member to depress the tubular member inwardly in localized areas to form corrugation on the external surface thereof and simultaneously form corrugations of substantially the same depth as that of the mold corrugations on the interior of said tubular member whereby the wire is retained in position in the internal corrugations;

(D) placing said tubular member in said mold and closing said mold has been inserted;

(E) subjecting said tubular member to heat and pressure to cause the tubular member and textile reinforcing material to assume the corrugated configuration of said mold and to vulcanize the elastomeric material to form the finished hose by causing the elastomeric material to flow through the interstices of said reinforcing material thereby creating a bond between the elastomeric material on opposite sides of said reinforcing material; and (F) subsequently inserting a preformed spiral wire reinforcement into the interior of the hose, said spiral wire reinforcement having an outside diameter to fit snugly into the troughs of the internal corrugations.

5. A method as claimed in claim 4 in which the corrugated portion of the mold is helical in configuration.

6. A method as claimed in claim 4 in which the tubular member comprises an inner tube of elastomeric material, a knit textile layer around said inner tube and a cover layer of elastomeric material over said reinforcement layer.

7. A method as described in claim 4 in which the external diameter of said tubular member is no greater than 0.015 of an inch more than the maximum diameter of the corrugated mold section.

8. A method as described in claim 4 in which the external diameter of the tubular member is no more than 0.112 of an inch less than the maximum internal diameter of the mold corrugations.

9. A method as described in claim 4 in which the internal corrugations of the hose are formed to restrain the preformed wire from moving with respect to the interior of said hose.

10. The method as claimed in claim 4 wherein the method of forming said tubular member comprises extruding an inner tubular member of elastomeric material, applying said textile reinforcing material over said inner tubular member and extruding an outer tubular member of elastomeric material over said textile reinforcing material.

11. The method as claimed in claim 4 or 10 wherein said textile reinforcing material consists of a single layer of knit fabric.

* * * * *

UNITED STATES PATENT AND TRADEMARK OFFICE
CERTIFICATE OF CORRECTION

PATENT NO. : 4,182,019
DATED : January 8, 1980
INVENTOR(S) : David N Tally, Richard L Marsh It is certified that error appears in the above-identified patent and that said Letters Patent are hereby corrected as shown below:

Column 6, line 2 should read as follows:

-- closing said mold; --

"has been inserted" should be deleted.

Signed and Sealed this

Twenty-ninth Day of July 1980

[SEAL]

Attest:

SIDNEY A. DIAMOND

Attesting Officer     Commissioner of Patents and Trademarks